(12) United States Patent
Sacomori et al.

(10) Patent No.: US 10,844,759 B2
(45) Date of Patent: Nov. 24, 2020

(54) VARIABLE SPEED COOLING COMPRESSOR INCLUDING LUBRICATING OIL PUMPING SYSTEM

(71) Applicant: Whirlpool S.A., Sao Paulo (BR)

(72) Inventors: Diego Sacomori, Joinville (BR); Adilson Luiz Manke, Joinville (BR)

(73) Assignee: Embraco—Industria De Compressores E Solucoes Em Refrigeracao Ltda., Joinville (BR)

( * ) Notice: Subject to any disclaimer, the term of this patent is extended or adjusted under 35 U.S.C. 154(b) by 146 days.

(21) Appl. No.: 15/407,907

(22) Filed: Jan. 17, 2017

(65) Prior Publication Data

US 2017/0204753 A1    Jul. 20, 2017

(30) Foreign Application Priority Data

Jan. 19, 2016    (CN) .......................... 2016 1 0126991

(51) Int. Cl.
| | |
|---|---|
| *F01M 1/02* | (2006.01) |
| *F04B 35/04* | (2006.01) |
| *F04B 39/02* | (2006.01) |
| *F16N 7/36* | (2006.01) |

(52) U.S. Cl.
CPC ............... *F01M 1/02* (2013.01); *F04B 35/04* (2013.01); *F04B 39/0246* (2013.01); *F04B 39/0261* (2013.01); *F16N 7/366* (2013.01); *F01M 2001/0238* (2013.01)

(58) Field of Classification Search
CPC ......... F01M 2001/0238; F04B 39/0246; F04B 39/0253; F04B 39/0261; F16N 7/366
See application file for complete search history.

(56) References Cited

U.S. PATENT DOCUMENTS

| | | | |
|---|---|---|---|
| 3,194,490 A | 7/1965 | Roelsgaard | 230/206 |
| 4,236,879 A * | 12/1980 | Abe | F04B 39/0246 |
| | | | 184/6.18 |
| 4,478,559 A * | 10/1984 | Andrione | F04B 39/0246 |
| | | | 417/368 |
| 7,100,743 B2 * | 9/2006 | Park | F04B 39/0246 |
| | | | 184/6.16 |
| 8,202,067 B2 | 6/2012 | Klein et al. | 417/410.3 |

(Continued)

FOREIGN PATENT DOCUMENTS

| | | |
|---|---|---|
| CN | 202579103 U | 12/2012 |
| DE | 10 2010 051 267 B3 | 12/2011 |

*Primary Examiner* — Minh Truong
(74) *Attorney, Agent, or Firm* — Harrington & Smith

(57) ABSTRACT

The present invention belongs to the technological field of cooling compressors and, particularly, constructive details of lubricating oil pumps of cooling compressors. Problem to be solved: The current state of the art does not describe any solution of oil pump and construction of rotating shaft capable of achieving the correct lubricating of the moving components that include the compression functional unit of cooling compressor, which operating speed can vary between 700 and 4500 rpm. Solution of the problem: It is disclosed is a variable speed cooling compressor which tubular extension of the oil pump, the inner axial channel of the rotating shaft, the axial channel extension of the rotating shaft and the inner cam channel segment of the rotating axis are all fluidly connected to each other in order to conform a single integrated channel.

6 Claims, 4 Drawing Sheets

(56) References Cited

U.S. PATENT DOCUMENTS

| | | | |
|---|---|---|---|
| 2006/0013706 A1* | 1/2006 | Ishida | F04B 39/0246 417/386 |
| 2006/0283322 A1* | 12/2006 | Lee | F04B 39/0253 92/78 |
| 2007/0028763 A1* | 2/2007 | Yoon | F04B 39/0022 92/153 |
| 2017/0114782 A1* | 4/2017 | Manke | F04B 35/04 |

* cited by examiner

VARIABLE SPEED COOLING COMPRESSOR INCLUDING LUBRICATING OIL PUMPING SYSTEM

FIELD OF THE INVENTION

The present invention relates to a cooling compressor, of variable speed, including a lubricating oil pumping system and, more particularly, a lubricating oil pumping system essentially defined by the rotating shaft of the compressor, which plays the role of a high efficiency helical oil pump.

In general, the core of the present invention comprises, more particularly, the constructive features of the compressor rotating shaft, which are largely responsible for the functional effects of lubricating oil pump.

BACKGROUND OF THE INVENTION

As within the knowledge of those skilled in the art, cooling compressors, which are usually airtight, provide for the use of lubricating oil to reduce friction and wear between the moving components and, in particular, the shaft and the moving components composing the compression functional unit of the cooling compressor. The rotating shaft is characterized by a major shaft, a peripheral flange and a cam portion (usually located in the upper portion).

The oil pump (centrifugal or helical) may be part of the rotating shaft or directly coupled to this, and may also be coupled indirectly through the compressor rotor, taking advantage of the movement of the own compressor rotating shaft (which is coupled to the compressor rotor).

The lubricating oil is stored in the inner lower portion of the airtight housing, wherein this region is named reservoir or crank case, being led to the moving elements that compose the compression functional unit of the compressor by means of the oil pump.

In general, the current state of the art comprises a concept of lubricating oil centrifugal pump and a concept of lubricating oil helical pump.

The centrifugal pumps are specially designed to compressors operating at medium and high speeds, usually above 1300 rpm. For a particular compressor operating speed, the oil flow is directly related to the equivalent diameter of the inner portions of the oil pump and the rotating shaft and to the repression height (distance from the oil level of the reservoir up to the portion of the rotating shaft where it is desired to pump the oil by centrifugal force), being directly proportional to first and inversely proportional to the second. An example of lubricating oil centrifugal pump can be seen in document U.S. Pat. No. 3,194,490. This example is further illustrated in FIG. 2 of this patent application. In general, the centrifugal pump described in document U.S. Pat. No. 3,194,490 document is able to suck and boost oil from the reservoir to the functional components that require lubrication. Thus, the main shaft of the compressor rotating shaft comprises an inner axial channel (defined in almost the entire length of the main shaft of the rotating shaft) and a second inner channel, usually cam, (defined from the junction with the axial channel in the main shaft, crossing the peripheral flange and terminating at the upper end of the rotating shaft) fluidly communicated with each other. Upon rotating the rotating shaft (as a function of the compressor operating), the lubricant oil is pumped by centrifugal force throughout the tubular axial channel of the rotating shaft, being transported to the cam inner channel of the rotating shaft, making it available to the compression functional unit of the compressor. It is worth emphasizing that further to the lubricating oil transportation, the circuit defined by the junction of the inner axial channel and the cam inner channel of the rotary axis is also responsible for the release of coolant gas (which is dissolved in the lubricating oil and is separated from it by the pressure reduction and stirring processes that occur within the oil pump) from inside the rotating shaft to the compressor housing environment, wherein said degassing process and lubricating oil pumping occur simultaneously. However, it should be emphasized that the centrifugal pump configuration described in document U.S. Pat. No. 3,194,490, due to high repression height (since the lubricating oil is available internally in the base of the cam portion), this solution usually requires that the rotating shaft has larger diameters, typically equal or greater than 18 mm. Since the pumping process (until the cam portion and functional unit of compression) occurs internally to the shaft, this is not able to meet the demands of pumping lubricant oil in compressors that operate at revs below 2000 rpm. Consequently, this concept cannot be implemented in variable speed compressors which minimum speeds can reach up to 700 rpm.

Another arrangement of drilling and rotary axes channels usually used with centrifugal pumps is described in document CN202579103. This example is further illustrated in FIG. 3 of this patent application. In this construction, the centrifuging process is limited to the initial portion of the main shaft, defining a reduced repression height compared to the previous solution. From this region, the lubricant oil happens to be pumped by an auxiliary system, defined by a structure of holes and a helical channel in the intermediate portion of the rotating shaft, more specifically, in part of the outer surface of the main shaft, cooperating with the inner surface of the bearing hub of the compressor block. An additional channel, which comprises an extension of the axial channel of the rotating shaft, is incorporated to provide the release of gas, regardless the lubricant oil transportation channels. Usually, the upper end of this additional gas releasing channel is located on the upper face of the peripheral flange of the rotating shaft.

On the other hand, the helical pumps are especially for compressors operating at low speed range, typically between 700 and 2000 rpm. An example of lubricating oil helical pump can be seen in document U.S. Pat. No. 8,202,067. This example is further illustrated in FIG. 4 of this patent application. In general, the helical pump described in document U.S. Pat. No. 8,202,067, as well as the vast majority of helical pumps, is able to suck and boost oil from the oil reservoir in the compressor housing until the moving functional components that require lubrication. The constructive structure of a helical pump normally comprises three main regions; a tubular portion, defined between the reservoir and the lower region of the rotary shaft, which may be integrated into this through a tubular extension, or even coupled to it directly or indirectly through the rotor; a retaining pin, housed inside the tubular portion; and an internal helical channel, defined in the cooperating interface between the outer face of the restraint pin and the inner face of the tubular portion. Evidently, the circuit defined by cooperation between the tubular portion, the restraint pin and the helical channel is fluidly communicated with the axial channel of the rotating shaft. The interface region where it is defined the inner helical channel of the helical pump is functionally characterized by a diametrical clearance parameter, defined by the diameters difference of the tubular portion and the restraint pin. This parameter is one of the most influential factors in the pumping efficiency of helical pumps. The larger the diametrical clearances, the lower the pumping efficiency. Low pumping efficiency helical pumps have typical diametrical clearances above 0.25 mm, while high efficiency pumps have typical diametrical clearances below 0.15 mm. Diametrical clearances between 0.15 mm and 0.25 mm characterize helical pumps of medium pumping efficiency. The diametrical clearances depend on the geometric tolerances, which are directly associated to the selection of materials and manufacturing processes used, which has a direct impact on the production cost. Thus, low cost helical pumps embodiments are common, with larger tolerances and, consequently, mean and low pumping efficiency. In compressors which use these helical pumps of medium and low pumping efficiency, it is also common to use an auxiliary oil pumping system, similar to that used in centrifugal pumps, defined by a structure of holes and a helical channel in the intermediate portion of the rotating shaft, more specifically, in part of the outer surface of the main shaft, cooperating with the inner surface of the bearing hub of the compressor block. Likewise the centrifugal pumps, it is worth emphasizing that rotating shafts incorporating helical pumps also require the presence of channels to provide the degassing process. It is also worth noting that, in constructions of rotating shafts (such as those described in document U.S. Pat. No. 8,202,067) with independent channel for removal of coolant gas, when used in conjunction with helical pumps of medium and high efficiency pumping, the lubrication of the cam portion may be impaired, mainly at high revs. This by the fact that part of the oil volume is pumped preferably through the gas withdrawing independent channel, resulting in the reduction of the oil flow rate by the outer helical channel of the main shaft, which feeds the cam portion of the rotating axis. The preferred oil transportation through the degassing channel is due to lower flow restriction (less pressure drop) of this circuit in relation to the circuit passing through the helical channel of the main shaft. Accordingly, the rotating shaft construction described in document U.S. Pat. No. 8,202,067 is not able to ensure proper lubrication of the cam portion of the rotating shaft when combined with pumps of medium and high pumping efficiency.

A particular construction of rotating shaft with integrated helical pump is shown in document DE102010051267. This example is further illustrated in FIG. 5 of this patent application. In this construction, the region of cooperation between the tubular region and the constraint pin extends also around the main shaft of the rotating shaft. It should be noted that the tubular region of the helical oil pump merges into the axial channel of the rotating shaft. In this construction, the radial holes of the oil supply to the radial bearing of the rotating axis (in the region of the main shaft) are located and fluidly connected to the region of cooperating interface between the outer face of the restraint pin and the inner face of the helical pump tubular extension. In this region, the lubricating oil available to the radial bearings also has coolant gas dissolved in the volume thereof, which decreases the load sustention capacity of these bearings, operating in a hydrodynamic lubrication regime. Therefore, this particular construction of rotating shaft with integrated helical pump has a deficient process of coolant gas withdrawal. Another disadvantage of this particular construction refers to the manufacturing cost, higher due to the need of a much longer constraint pin, and consequently a more accurate control of errors in the form, dimensional tolerances and surface finishes in the tubular region. In the other configurations of helical pumps, usually the length of the constraint pin is limited to a narrower cooperating portion.

The current state of the art does not describe any oil pump solution and construction of rotating shaft able to achieve the optimal lubrication of the moving components that comprise the compression functional unit of cooling compressors, which operating speeds may vary between 700 and 4500 rpm. It is based on this assumption that the present invention arises.

OBJECTIVES OF THE INVENTION

Thus, it is one of the objectives of the present invention to disclose a variable speed cooling compressor, including a lubricating oil pumping system, wherein said helical type pump, which is formed by a structure of holes and lubrication channels in the rotating shaft, capable of achieving effective lubrication of the moving components that compose the compression functional unit of cooling compressors, which operating speeds may vary between 700 and 4500 rpm. Thus it is also one of the objectives of the present invention to ensure a proper lubrication to the radial bearings of the main shaft and the cam portion of the rotating shaft, throughout the whole range of operating revs of variable speed compressors.

It is another objective of the present invention that the rotating shaft of the compressor comprises gas releasing means which do not influence the throughput and efficiency of the lubricating oil transportation means.

SUMMARY OF THE INVENTION

All the objectives of the invention are achieved by means of the variable speed cooling compressor including lubricating oil helical pump, which comprises at least one housing, at least an electric engine comprising a stator and a rotor, at least one compression mechanism, at least one compressor block, at least one rotating axis and at least one restraint pin, wherein the cooperation and interaction between the compressor block, the rotating shaft and the restraint pin defines an oil pump, which comprises at least one tubular extension and a helical channel segment.

According to the instant invention, said rotating shaft comprises a lower portion, at least one intermediate portion, at least one peripheral flange and at least one cam upper portion, further to comprising at least one inner axial channel, at least one extension of channel axial and at least one inner cam channel segment.

The tubular extension of the oil pump, the inner axial channel of the rotating shaft, the axial channel extension of the rotating shaft and the inner cam channel segment of the rotating shaft are all fluidly connected to each other in order to conform one single integrated channel.

Also according to the present invention, said intermediate portion of the rotating shaft comprises at least one first radially passing hole and at least one second radially passing hole, both being able to establish fluid communication between the integrated channel and the cooperating and interaction region between the compressor block and the rotating shaft.

Thus, the gas is transported from the intermediate portion of the rotating shaft to the cam upper portion of the rotating shaft only be means of the integrated channel.

Preferably, the rotating shaft further comprising, on the outer face of the intermediate portion, an outer intermediate helical channel segment able to establish fluid communication between the radially passing hole and the radially passing hole, wherein the first radially passing hole is able to establish fluid communication between the lower end of the outer intermediate helical channel segment and the inner axial channel of the rotating shaft.

Further preferably, the second radially passing hole is able to establish fluid communication between the upper end of the outer intermediate helical channel segment and the inner cam channel segment of the rotating shaft.

BRIEF DESCRIPTION OF THE DRAWINGS

The preferred embodiment of the subject invention is described based on the illustrative figures listed below, which.

DETAILED DESCRIPTION OF THE INVENTION

Preliminarily, it is Worth emphasizing that the categorizations of "high speed" and "low speed" relating to the working or operation of the variable speed cooling compressor refer, respectively, to rotational speeds set between 700 rpm and 2000 rpm and between 2000 rpm and 4500 rpm.

Based on this assumption, it should be noted that the current state of the art already includes variable speed cooling compressors, which are usually equipped with permanent magnet motors, powered by a frequency inverter. However, they are not known variable speed cooling compressors able to ensure a proper lubrication to the radial bearings of the main shaft and the cam portion of the rotating shaft and comprising gas releasing means that do not influence the throughput and efficiency of the lubricating oil transportation means, throughout the whole range of operating revs of variable speed compressors.

Accordingly, the present invention is exactly based on this technological gap.

Figure 1:
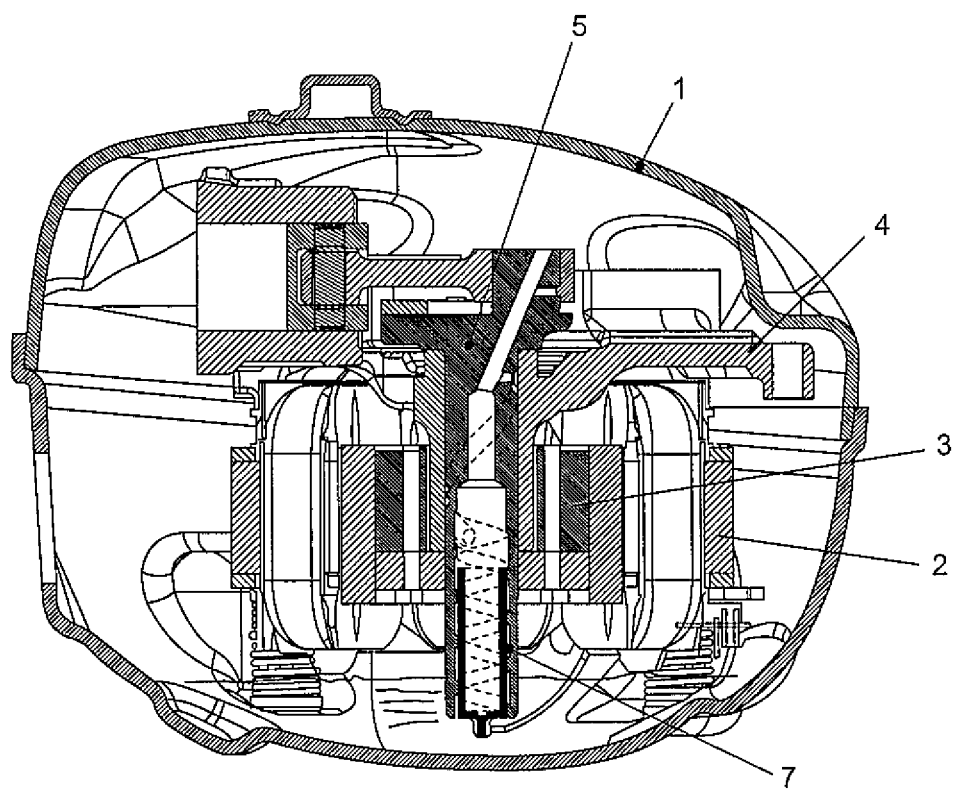
FIG. 1 illustrates, in schematic section, the cooling compressor including lubricating oil pumping system, according to the present invention.
Figure 2:
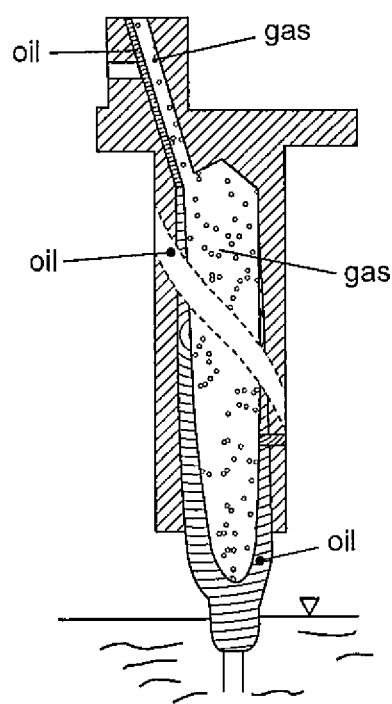
FIG. 2 illustrates, in schematic section, the rotating shaft that is part of the cooling compressor and the lubricant oil pumping system for centrifugal pump, including a first typical configuration formed by a structure of holes and lubrication channels, according to the state of the art shown in document U.S. Pat. No. 3,194,490.
Figure 3:
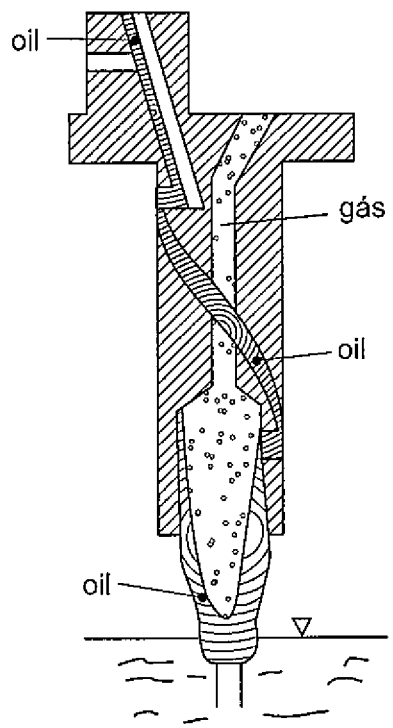
FIG. 3 illustrates, in schematic section, the rotating shaft that is part of the cooling compressor and the lubricant oil pumping system by centrifugal pump, including a second typical configuration formed by a structure of holes and lubrication channels, according to the state of the art shown in document CN202579103U.
Figure 4:
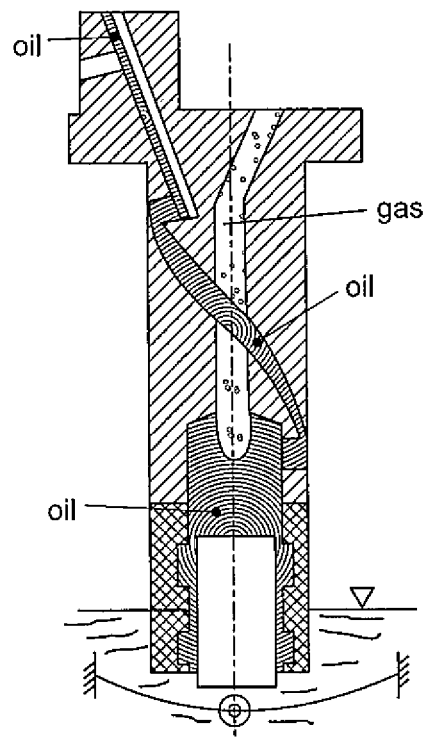
FIG. 4 illustrates, in schematic section, the rotating shaft that is part of the cooling compressor and the lubricant oil pumping system by helical pump, including a first typical configuration formed by a structure of holes and lubrication channels in the rotating shaft, according to the state of the art shown in document U.S. Pat. No. 8,202,067.
Figure 5:
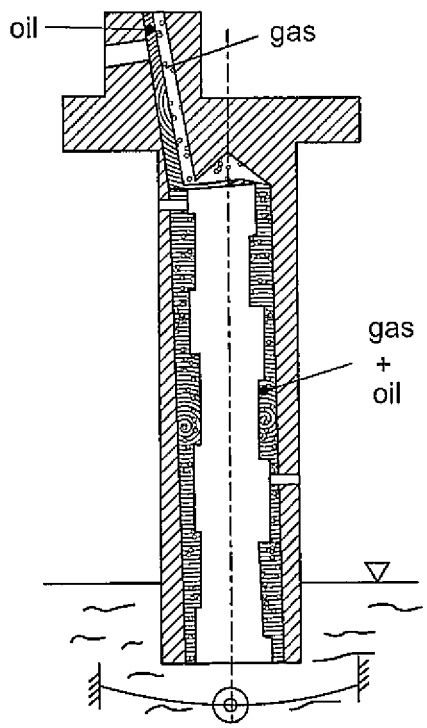
FIG. 5 illustrates, in schematic section, the rotating shaft that is part of the cooling compressor and the lubricant oil pumping system by helical pump, including a second typical configuration formed by a structure of holes and lubrication channels, according to the state of the art shown in document DE102010051267.

As illustrated in FIG. 1, it is observed that the variable speed cooling compressor including lubricating oil helical pump, according to the present invention, comprises an essentially traditional general embodiment, i.e. a casing 1, preferably airtight, within which there are present, in addition to other trivial components and systems and required to the general operation of a variable speed cooling compressor, an electric engine composed of a stator 2 and a rotor 3, a compression mechanism, a compressor block 4 and a rotating shaft 5.

The oil pump 7 is defined by the cooperation between the lower end of rotating shaft 5 and stationary restraint pin 6 and mounted within the lower tubular portion of rotating shaft 5. Said oil pump 7 contains inside a helical channel segment 72, defined between the inner face of tubular extension 71 of rotating shaft 5 and the outer face of restraint pin 6. The oil pump is partially immersed in the lubricating oil accumulated in the reservoir (bottom of casing 1).

In this regard, it is noteworthy that, except to rotating shaft 5, all components that compose the variable speed cooling compressor, object of the present invention, are components widely known to those skilled in the art. Accordingly, a detailed description of such components can be easily found in related technical bibliography.

Thus, the great merit of the present invention refers to rotating shaft 5 which, as could not be otherwise, is associated with rotor 3 of the electric engine of the compressor.

Figure 6:
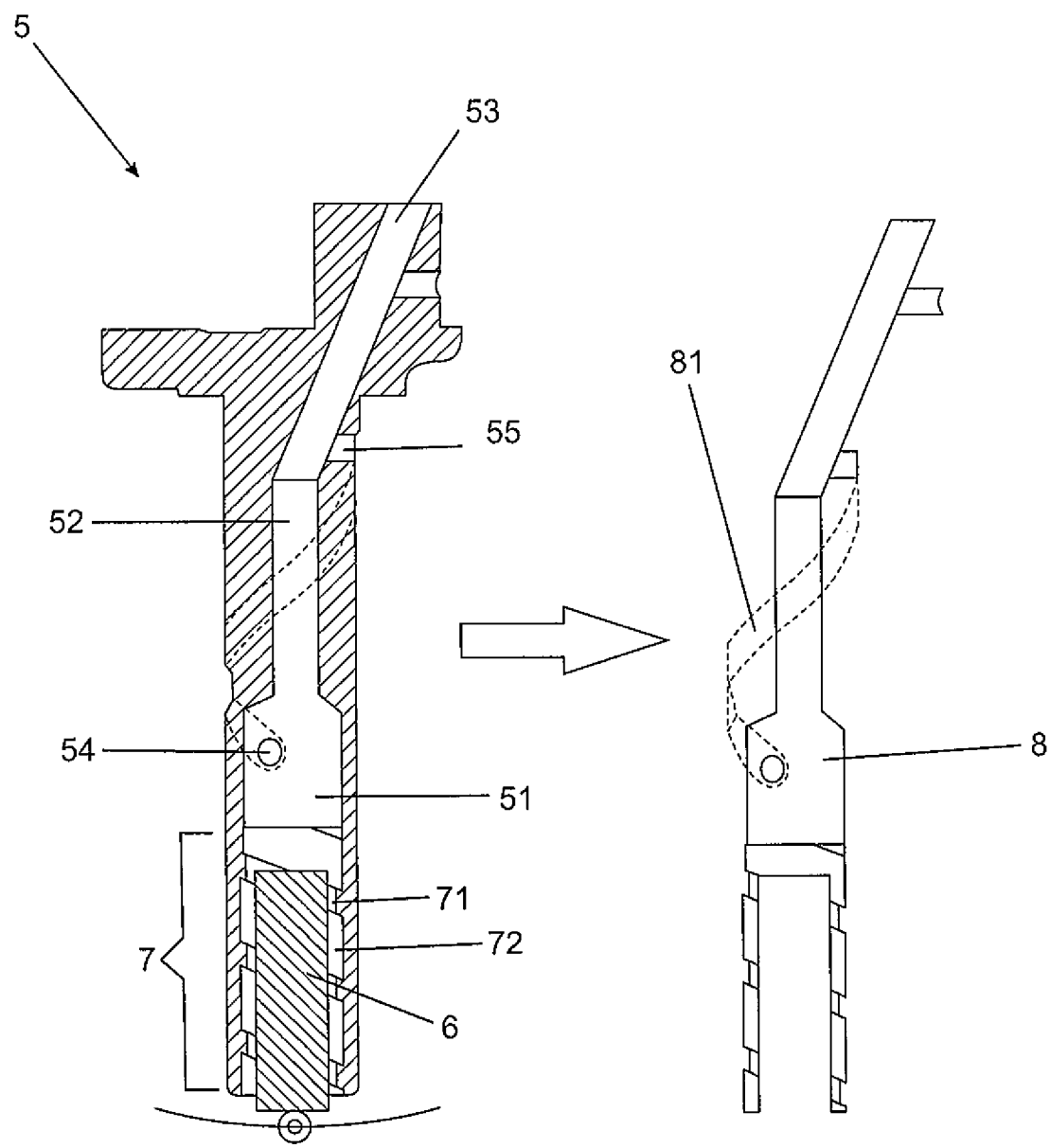
FIG. 6 illustrates, in schematic section, the rotating shaft that is part of the cooling compressor and the lubricant oil pumping system by helical pump, including the preferred configuration formed by a structure of holes and lubrication channels, according to the present invention.

As illustrated in FIG. 6, rotating shaft 5 comprises a cylindrical portion and a cam portion, wherein there is a peripheral flange between both.

From a general point of view, the cylindrical portion of rotating shaft 5 is one to be associated to the rotor of the electric engine of the compressor, and the cam portion of rotating shaft 5 is one to be associated to the compressing mechanism of the compressor.

Rotating shaft 5 is fundamentally hollowed, comprising upper and lower open ends. It means that, internally, rotating shaft 5, in accordance with the subject invention, comprises a lubrication channel structure defined by: an inner axial channel 51, an axial channel extension 52 and an inner cam channel segment 53.

According to the preferred embodiment of the subject invention, inner axial channel 51 comprises an inner volume existing in the intermediate region of rotating shaft 5. As shown in FIG. 6, said inner axial channel 51 is limited in the bottom by the top of restraint pin 6 and limited in the top by the extension of axial channel 52 of rotating shaft 5.

Also according to the preferred embodiment of the subject invention, inner cam channel segment 53 comprises a bent passing hole originating in the cam portion of rotating shaft 5.

Still according to the preferred embodiment of the present invention, an inner lower helical channel segment 72 is defined in the interface of the tubular extension 71 and restraint pin 6. Thus inner lower helical channel segment 72 can be defined by the cooperation between an helical groove existing in the inner face of tubular extension 71 of rotating shaft 5 and the smooth outer face of restraint pin 6, or by the cooperation between smooth inner face of tubular extension 71 of rotating shaft 5 and an helical groove existing in the outer face of restraint pin 6.

The fluid connection between said tubular extension 71 of oil pump 7, inner axial channel 51, axial channel extension 52 and inner cam channel segment 53 conform inside rotating shaft 5, a lubricating and degassing integrated channel 8.

Still considering a second preferred embodiment of the subject invention, integrated channel 8 can incorporate an outer intermediate helical channel segment 81, comprising a helical groove defined in a portion of the outer face of the main shaft of rotating shaft 5. As is within the knowledge of the technicians skilled in the art, so that said groove can, in fact, transport oil, it is necessary that it cooperates with certain walls of the bearing hub of the compressor block 4, as shown in FIG. 1.

Evidently, said outer intermediate helical channel 81 is fluidly connected with the inside of rotating shaft 5 through a first radially passing hole 54 and a second radially passing hole 55, both of which are able to establish fluid communication between integrated channel 8 and the cooperating and interaction area between the compressor block 4 and rotating shaft 5.

This outer intermediate helical channel segment 81 operates in parallel to integrated channel 8, especially in helical pumps of medium pumping efficiency (diametrical clearances between 0.15 and 0.25 mm).

It is lubricating and degassing integrated channel 8 that enables high efficiency of lubricating and degassing both at low and high operating speeds of the cooling compressor.

Figure 7:
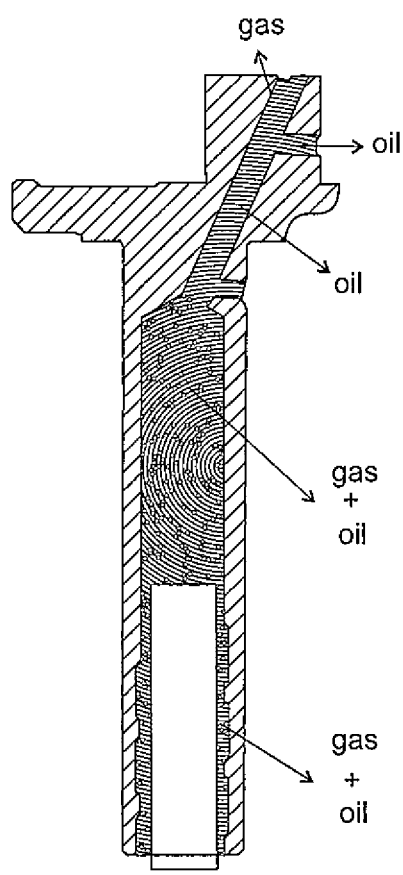
FIG. 7 illustrates, in schematic section, the general operation of the lubricant pumping system by helical pump according to the present invention, when the cooling compressor operates with a pump of high efficiency and/or high flow rate of oil.

As illustrated in FIG. 7, when the cooling compressor operates with a helical pump of high pumping efficiency, the lubricant oil and the coolant gas are transported, from the lower end to the upper end of rotating shaft 5, by means of integrated channel 8.

Figure 8:
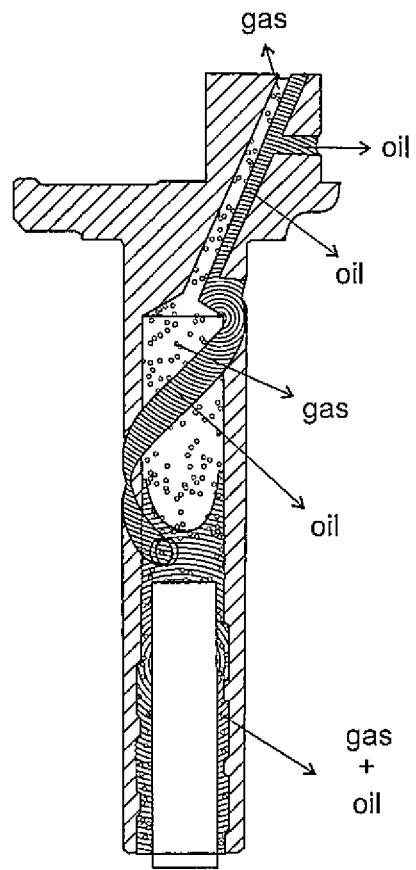
FIG. 8 illustrates, in schematic section, the general operation of the lubricant oil pumping system by helical pump, according to the present invention, when the cooling compressor operates with a pump of low efficiency and/or low flow rate of oil.

On the other hand, and as illustrated in FIG. 8, when the cooling compressor operates with a pump of a low lubrication efficiency, the lubricating oil is transported, from the lower end to the upper end of rotating shaft 5, preferably by means of inner axial channel 52, outer intermediate helical channel segment 81 and inner cam channel segment 53; and the coolant gas contained in the lubricating oil is transported, from the lower end to the upper end of rotating shaft 5, by means of integrated channel 8.

This occurs by the fact that helical pumps of low efficiency, operating at low revs, are unable to pump a sufficient volume of oil through the integrated channel, then it is used the outer intermediate helical channel segment axis of the rotating shaft as a second helical pump oil, to transport the oil of the intermediate portion of the shaft to the cam portion (top). At low flow rates of oil, the section of the outer helical channel segment of the shaft is sufficient to transport all the oil provided by the helical pump to the cam portion.

But in helical pumps of high efficiency, the oil flow rate through the outer intermediate helical channel segment of the rotating axis is, however, limited by the cross section thereof. Wherein the flow rate of oil through the outer intermediate helical channel segment of the rotating shaft is fully achieved, additional oil flow rate provided by helical pump is pumped through the integrated channel of the rotating shaft to the cam portion. The presence of the inner cam channel segment, whether interconnecting the extension of the axial channel to the upper face of the peripheral flange or to the cam portion, also operates as a high efficiency pump, with pumping capacity higher than the outer intermediate helical channel segment of the rotating shaft. Thus, when achieving the inner cam channel segment by the inner portion of the shaft, the oil happens to be preferably pumped by it. In the case of this hole is connected to the cam portion (objective of the application), and not the upper face of the peripheral flange, all the oil is directed to the cam portion, as well as in low efficiency pumps. Therefore, the lubrication efficiency of the cam portion is achieved in different pumping efficiency regimes.

The invention claimed is:

1. A variable speed cooling compressor including a lubricating oil helical pump, comprising:
   at least one casing, at least one electric engine composed of a stator and a rotor, at least one compression mechanism, at least one compressor block, at least one rotating shaft, and at least one restraint pin;
   wherein cooperation and interaction between the at least one compressor block, the at least one rotating shaft, and the at least one restraint pin defines the lubricating oil helical pump;
   said rotating shaft comprising at least one lower portion, at least one intermediate portion, at least one peripheral flange, and at least one cam upper portion;
   said rotating shaft further comprising at least one inner axial channel, at least one axial channel extension, and at least one inner cam channel segment;
   said oil pump comprising at least one tubular extension and a helical channel segment;
   said variable speed cooling compressor including the lubricating oil helical pump being comprised by:
   the at least one tubular extension of the lubricating oil helical pump, the at least one inner axial channel of the rotating shaft, the at least one axial channel extension of the rotating shaft, which defines the lubricating oil helical pump, and the at least one inner cam channel segment of the rotating shaft are all fluidly interconnected to each other in order to conform a single integrated channel; and characterized by
   said at least one intermediate portion of the rotating shaft comprises at least one first radially passing hole and at least one second radially passing hole connecting the at least one inner axial channel with the inner cam channel segment, both the first and the second radially passing holes being able to establish fluid communication between the integrated channel and the cooperation and interaction between the compressor block and the rotating shaft.

2. The compressor according to claim 1, characterized in that a gas is transported from the intermediate portion of the rotating shaft to the at least one cam upper portion of the rotating shaft only by means of the integrated channel.

3. The compressor according to claim 1, characterized by the rotating shaft further comprising, on the outer face of the intermediate portion, an outer intermediate helical channel segment able to establish fluid communication between the at least one first radially passing hole and the at least one second radially passing hole.

4. The compressor according to claim 3, characterized by the at least one first radially passing hole being able to establish fluid communication between the lower end of the outer intermediate helical channel segment and the at least one inner axial channel of the rotating shaft.

5. The compressor according to claim 3, characterized by the at least one second radially passing hole being able to establish fluid communication between the upper end of the outer intermediate helical channel segment and the at least one inner cam channel segment internal to the rotating shaft.

6. The compressor according to claim 1, characterized by the at least one axial channel and the at least one axial channel extension having the same diametrical dimension.

* * * * *